United States Patent
Adams et al.

(10) Patent No.: US 11,658,333 B2
(45) Date of Patent: *May 23, 2023

(54) MICROPOROUS BATTERY SEPARATORS INCLUDING POLYOLEFIN LAYER AND NON-WOVEN LAYER WITH ALKYLBENZENE SULFONIC ACID LITHIUM SALT SURFACTANT, LITHIUM BATTERIES UTILIZING THE SAME, AND METHODS OF MANUFACTURE OF THE SAME

(71) Applicant: Celgard, LLC, Charlotte, NC (US)

(72) Inventors: Changqing Wang Adams, Fort Mill, SC (US); C. Glen Wensley, Rock Hill, SC (US); Stefan Reinartz, Waxhaw, NC (US)

(73) Assignee: Celgard, LLC, Charlotte, NC (US)

( * ) Notice: Subject to any disclaimer, the term of this patent is extended or adjusted under 35 U.S.C. 154(b) by 318 days.

This patent is subject to a terminal disclaimer.

(21) Appl. No.: 16/921,952

(22) Filed: Jul. 7, 2020

(65) Prior Publication Data

US 2020/0343510 A1 Oct. 29, 2020

Related U.S. Application Data

(62) Division of application No. 15/146,936, filed on May 5, 2016, now Pat. No. 10,741,814.

(Continued)

(51) Int. Cl.
*H01M 10/0525* (2010.01)
*H01M 50/44* (2021.01)
(Continued)

(52) U.S. Cl.
CPC ..... *H01M 10/0525* (2013.01); *H01M 50/403* (2021.01); *H01M 50/417* (2021.01);
(Continued)

(58) Field of Classification Search
CPC .. H01M 50/449; H01M 50/44; H01M 50/411; H01M 50/5825
(Continued)

(56) References Cited

U.S. PATENT DOCUMENTS 5,902,696 A 5/1999 Smesko et al.
5,922,492 A 7/1999 Takita et al.
(Continued)

FOREIGN PATENT DOCUMENTS

WO WO01/52341 A1 7/2001

OTHER PUBLICATIONS

EP Extended Search Report dated Oct. 15, 2020; from EP Divisional counterpart Application No. 20185583.0.

*Primary Examiner* — Sean P Cullen
(74) *Attorney, Agent, or Firm* — Hammer & Associates, P.C.

(57) ABSTRACT

In accordance with at least certain embodiments, the present invention is directed to novel, improved, coated, or treated separator membranes, separators or membrane based separators for lithium batteries. The membranes or separators may include non-woven layers, improved surfactant treatments, or combinations thereof. The separators or membranes are useful for solvent electrolyte lithium batteries, especially rechargeable lithium ion batteries, and provide improved performance, wettability, cycling ability, and/or recharging efficiency.

13 Claims, 4 Drawing Sheets

Related U.S. Application Data

(60) Provisional application No. 62/297,166, filed on Feb. 19, 2016, provisional application No. 62/158,582, filed on May 8, 2015.

(51) Int. Cl.
  *H01M 50/403* (2021.01)
  *H01M 50/494* (2021.01)
  *H01M 50/489* (2021.01)
  *H01M 50/417* (2021.01)
  *H01M 50/457* (2021.01)
  *H01M 50/454* (2021.01)
  *H01M 4/58* (2010.01)

(52) U.S. Cl.
  CPC ......... *H01M 50/44* (2021.01); *H01M 50/454* (2021.01); *H01M 50/457* (2021.01); *H01M 50/489* (2021.01); *H01M 50/494* (2021.01); *H01M 4/5825* (2013.01)

(58) Field of Classification Search
  USPC ........................................ 429/144, 250, 254
  See application file for complete search history.

(56) References Cited

U.S. PATENT DOCUMENTS

| | | |
|---|---|---|
| 6,475,666 B1 | 11/2002 | Takeuchi |
| 6,511,774 B1 | 1/2003 | Tsukuka et al. |
| 8,022,107 B2 | 9/2011 | Murphy et al. |
| 10,741,814 B2 * | 8/2020 | Adams ................ H01M 50/494 |
| 2002/0106557 A1 | 8/2002 | Fraser-Bell et al. |
| 2008/0124623 A1 | 5/2008 | Hisamitsu et al. |
| 2011/0223486 A1 | 9/2011 | Zhang et al. |
| 2011/0229750 A1 | 9/2011 | McLellan et al. |
| 2011/0236764 A1 * | 9/2011 | Takita ................ H01M 50/449 |
| | | 521/134 |
| 2012/0070750 A1 | 3/2012 | Blanc et al. |
| 2012/0148901 A1 | 6/2012 | Okamoto |
| 2013/0260207 A1 * | 10/2013 | Uemura ................ H01M 4/604 |
| | | 521/134 |
| 2013/0309548 A1 | 11/2013 | Takeshi |
| 2015/0188140 A1 * | 7/2015 | Kose ......................... C08F 2/26 |
| | | 524/546 |
| 2015/0306539 A1 | 10/2015 | Yamato |
| 2016/0344039 A1 | 11/2016 | Sano et al. |

* cited by examiner

MICROPOROUS BATTERY SEPARATORS INCLUDING POLYOLEFIN LAYER AND NON-WOVEN LAYER WITH ALKYLBENZENE SULFONIC ACID LITHIUM SALT SURFACTANT, LITHIUM BATTERIES UTILIZING THE SAME, AND METHODS OF MANUFACTURE OF THE SAME

CROSS REFERENCE TO RELATED APPLICATIONS

This application is a Divisional Application of U.S. application Ser. No. 15/146,936, filed May 5, 2016, which claims priority to and the benefit of U.S. Provisional Application No. 62/158,582 filed May 8, 2015, and U.S. Provisional Application No. 62/297,166 filed Feb. 19, 2016, each hereby fully incorporated by reference herein.

FIELD OF THE INVENTION

In accordance with at least selected embodiments, the present application or invention is directed to novel or improved separator membranes, separators, batteries, cells, systems, and/or methods of making such membranes, separators, batteries, cells, and/or systems, and/or methods of using such membranes, separators, batteries, cells, and/or systems. In accordance with at least certain embodiments, the present application or invention is directed to novel or improved multilayer or laminated battery separators or membranes, lithium ion batteries including such separators, and/or methods of making and/or using such battery separators and/or lithium batteries, including but not limited to rechargeable lithium batteries, secondary lithium ion batteries, and the like. In accordance with at least certain particular embodiments, the present invention is directed to a multilayer microporous battery separator having at least one nonwoven layer, and adapted for use in rechargeable lithium ion batteries and/or the methods related to making and/or using such multi-layered separators. In accordance with at least certain selected particular embodiments, the present application or invention is directed to novel or improved composite, multilayer or laminated battery separators having at least two nonwoven layers, lithium batteries including such separators, and/or methods of making and/or using such battery separators and/or lithium batteries. In accordance with at least selected certain embodiments, the present invention is directed to surfactant or material coated, treated or containing microporous battery separator membranes or separators, lithium batteries including such separator membranes or separators, and/or methods of making and/or using such battery separators and/or lithium batteries. In accordance with at least certain selected embodiments, the present invention is directed to surfactant or wettability enhancing material coated, treated or containing composite, multilayer or laminated battery separators having at least one nonwoven layer, possibly preferably two nonwoven layers (one on each side) for a rechargeable lithium ion battery and/or a method of making a surfactant coating for a microporous battery separator for a rechargeable lithium ion battery, and/or methods of making and/or using such separators, batteries, and/or the like. In accordance with at least selected embodiments, the present invention is directed to novel or improved surfactants, wettability enhancing materials, coatings, treatments, components, and/or the like, membranes, separators, composites, multilayer or laminated battery separators, separators having at least one nonwoven layer, separators having two nonwoven layers (one on each side) for a rechargeable lithium battery having the novel or improved surfactants, wettability enhancing materials, coatings, treatments, and/or components, and/or a method of making the novel or improved surfactants, wettability enhancing materials, coatings, treatments, and/or components, and/or methods of using the novel or improved surfactants, wettability enhancing materials, coatings, treatments, and/or components, and/or the separators, batteries, and/or the like having such novel or improved surfactants, wettability enhancing materials, coatings, treatments, and/or components therein.

BACKGROUND OF THE INVENTION

Lithium batteries, such as lithium ion (Li-ion) batteries are attractive for stationary energy storage applications due to their fast response, high power capability, high efficiency, and long lifetime. The main components of a lithium ion battery are the electrodes (anode and cathode), electrolyte and a porous separator membrane. There are a wide variety of electrode materials, electrolytes and porous separator membrane materials available for use in rechargeable lithium batteries. Some lithium ion batteries use lithium cobalt oxide ($LiCoO_2$), lithium manganese oxide ($LiMn_2O_4$), lithium nickel oxide ($LiNiO_2$), or lithium iron phosphate (LFP or $LiFePO_4$) as the cathode active material while the anodes may be made of carbon. Electrolytes can be organic or inorganic and facilitate the transfer of ions during the charge and discharge cycles. The separator can be a porous membrane that physically separates the anode from cathode and is ionically conductive (in electrolyte) and electronically insulating. The electrolyte is in close contact with the separator, and the separator pores should be fully wet by electrolyte for efficient movement of ions during charge and discharge cycles. The separator can be a microporous separator membrane made of a polyolefin. Polyolefins can be wet to a different degree by various organic and inorganic electrolytes. Charging capacity and battery performance are enhanced when the separator is quickly wet by an electrolyte.

Known separators may be microporous and made from polyolefins. Such polyolefin (PO) separators can provide excellent performance and safety in battery systems. Some polyolefin separators such as certain polypropylene (PP) separators are hydrophobic and may be less efficient at wetting or electrolyte filling in certain inorganic lithium ion battery systems. The proper wetting of a separator is necessary for the efficient movement of ions during cycling. Single layer non-woven separators have been utilized in certain inorganic battery systems but these non-wovens are typically too porous and may not adequately protect against shorts or dendrite growth.

Chemical treatments can alter the hydrophilicity of a polyolefin separator membrane, however, such treatments may not be permanent and/or unreactive in the electrolyte, as well as stable to any potential byproducts generated during repeated cycling of a rechargeable lithium ion battery. Hence, there is a need for improved separators that provide the high performance of a polyolefin membrane and the wettability of a nonwoven for at least certain battery chemistries or systems.

SUMMARY OF THE INVENTION

In accordance with at least selected embodiments, aspects, or objects, the present invention may address one or more of the above needs and/or may provide novel, improved, coated, and/or treated separator membranes, separators, and/or methods of making such membranes and/or separators, and/or methods of using such membranes and/or separators in lithium batteries, such as secondary lithium ion batteries, such as used in products, devices, vehicles, systems, energy storage, and/or the like. In accordance with at least certain embodiments, the present invention is directed to a microporous separator membrane having at least one non-woven layer on at least one side thereof. In certain embodiments, the invention is directed to separator membranes having at least one surfactant coating, treatment or component. In accordance with at least certain embodiments, the present invention is directed to a separator membranes or separators having at least one non-woven layer and at least one surfactant treatment. In accordance with at least certain embodiments, the separator, laminate or composite includes at least one non-woven layer laminated or otherwise attached to at least one porous polyolefin layer or membrane. In certain embodiments, the separator, laminate or composite may include two porous nonwoven layers, each laminated or otherwise attached to a face of a porous polyolefin layer or membrane (nonwoven/PO membrane/nonwoven), with or without surfactant treatments. In certain embodiments the polyolefin layer may be a microporous polypropylene or polyethylene monolayer. In other embodiments, the polyolefin layer may be a laminated or co-extruded multilayer. In at least certain embodiments, the polyolefin layer may be a polypropylene or polyethylene bilayer. In at least certain embodiments, the polyolefin layer may be a trilayer of polypropylene and/or polyethylene. The layers being the same or different polyolefins, either laminated or co-extruded together. For instance, the surfactant treated separator membrane or separator can include single layers such as PE, PP, co-polymers or blends thereof, or multiple layers or plies such as PE/PE, PP/PP, PE/PP, PP/PE/PP, PE/PP/PE, PE/PE/PE, PP/PP/PP, PP/PE/PE/PP, PE/PP/PP/PE, and higher order composites as well, with or without other layers, nonwovens, coatings, and/or the like.

In certain embodiments, the possibly preferred separator includes one or more non-woven (NW) layers laminated, bonded or tacked to a microporous polyolefin membrane, base film or separator. In a possibly preferred embodiment, the separator includes at least one non-woven or nonwoven (NW) layer laminated, bonded or tacked to each side of a single or multi-layer or ply microporous polyolefin membrane, layer, base film or separator. Such a separator having a nonwoven layer or material on each side forms a very robust construction. The nonwoven may enhance the wettability of the polyolefin layer. In one embodiment the microporous polyolefin layer may be a monolayer of polypropylene (PP) or polyethylene (PE), co-polymer or blend resulting in a separator with a final construction of NW/PP/NW, NW/PE/NW, or NW/PE-PP/NW. In another embodiment the polyolefin layer may be multiple layers for example NW/PP/PP/NW, NW/PE/PE/NW, NW/PP/PE/NW, NW/PE/PP/PE/NW or NW/PP/PE/PP/NW. In another embodiment the polyolefin layer may contain one or more laminated or coextruded trilayers (NW/PP/PE/PP/NW, NW/PE/PP/PE/NW or NW/PE/PP/PE/PP/PE/NW, or the trilayer may be made of several homopolymer or polyolefin co-polymers or blends for example NW/PP/PP/PP/PE/PP/PP/PP/NW, NW/PE/PE/PP/PE/PE/NW, NW/PP/PE/PP/PE/PP/PE/PP/NW, or NW/PP-PE/PE-PP/PE-PP/PP-PE/NW.

In accordance with at least selected embodiments, the present application or invention is directed to novel or improved separators with one or more surfactant treatments. The inventive surfactant treatment can improve the wettability of a microporous battery separator membrane, membrane separator or separator in a rechargeable lithium ion battery system by various electrolytes, including organic and/or inorganic nonaqueous electrolytes. The inventive hydrophilic or hydrophobic surfactant coating can enhance the wetting speed and wetting capacity of the microporous polyolefin separator membrane by an organic and/or an inorganic nonaqueous electrolyte. In addition, the inventive surfactant treatment can enhance the stability of the separator membrane in electrolyte. Use of the inventive surfactant coated microporous polyolefin membrane or separator in a rechargeable lithium ion battery can optimize the charging capacity of the lithium ion battery and promote long cycle life performance of the lithium ion battery in consumer electronics (CE), electric vehicles (EV) and electric or energy storage systems or battery energy storage systems (ESS or BESS), and/or the like.

The possibly preferred inventive treatment for a polyolefin microporous separator membrane for a lithium ion battery is a surfactant coating which when applied to the surface and pores of a porous separator membrane, makes the membrane more easily wetted and more completely wetted by an organic or inorganic electrolyte. It is possibly preferred to develop, select or use a surfactant that is chemically stable in the harsh chemical environment of a lithium ion battery, stable in overcharging products, and that also makes the porous separator membrane permanently or stably hydrophilic or wettable. The separator should wet easily in the electrolyte and retain the electrolyte. The former facilitates the process of electrolyte filling in battery assembly and the latter increases cycle life of the battery. Enhancing the electrolyte wetting of separators by surface modification may be critical to preparing high-performance lithium-ion batteries. Due to the inherent hydrophobic properties of non-polar polyolefin separators, the electrolytes containing a high content of polar solvents may exhibit a poor wettability and electrolyte retention.

In accordance with selected embodiments, the present invention may be directed to a surfactant treated separator membrane, membrane separator or separator for a rechargeable lithium battery and/or a method of making a surfactant treatment for a battery separator for a lithium battery. In addition, the present invention is directed to a surfactant treatment for a separator membrane for use in a rechargeable lithium ion battery where the lithium ion battery can be comprised of 1) an electrode material comprising lithium cobalt oxide ($LiCoO_2$), lithium manganese oxide ($LiMn_2O_4$), lithium nickel oxide ($LiNiO_2$), lithium iron phosphate (LFP or $LiFePO_4$), or combinations thereof, 2) an organic or inorganic electrolyte, and 3) a surfactant treated battery separator membrane.

In accordance with at least selected embodiments, the inventive surfactant coating, treatment or component (may be added to the resin and/or electrolyte) is a surfactant, hydrophilic surfactant, water repelling surfactant, wetting agent, or material, such as lithium dodecylbenzene sulfonate (LiDBS), nonionic fluorosurfactant, lithium stearate, or the like coating, treatment or component for a microporous battery separator which can improve the wettability of a microporous polyolefin battery separator in a rechargeable lithium ion battery system by various electrolytes, including organic and/or inorganic nonaqueous electrolytes. When using lithium stearate, it may be preferred to add it to the resin. The inventive surfactant coating can enhance the wetting speed and wetting capacity of the microporous polyolefin separator membrane by an organic and/or an inorganic nonaqueous electrolyte. In addition, the inventive surfactant coated separator membrane or separator may be chemically stable in various electrolytes. Use of the inventive surfactant coated microporous polyolefin separator in a rechargeable lithium ion battery can optimize the charging capacity of the lithium ion battery and promote long cycle life performance of the lithium ion battery in consumer electronics (CE), electric vehicles (EV), electric storage systems (ESS or BESS), and/or the like.

DETAILED DESCRIPTION OF THE INVENTION

Figure 1:
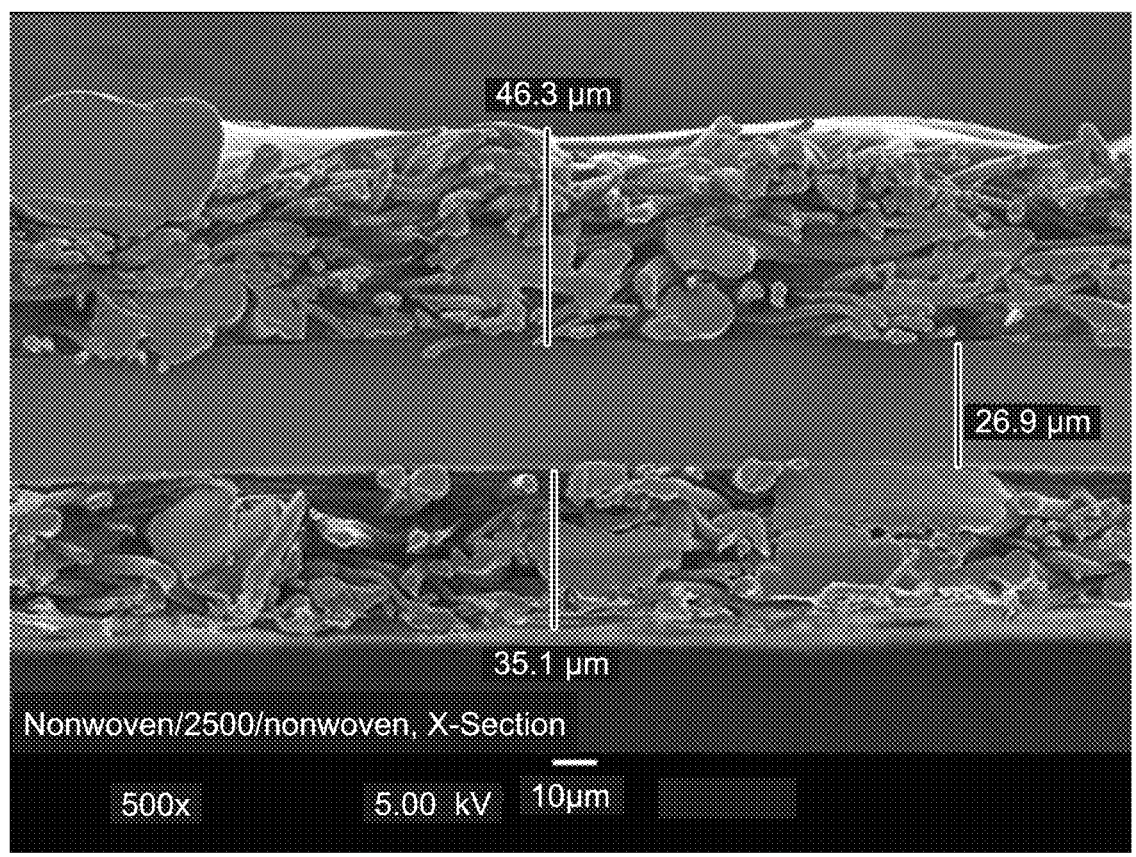
FIG. 1 is a cross-section SEM image at 500× of a separator having melt-blown non-woven layers laminated to each side of a polyolefin layer.

In certain embodiments, the separator includes at least one nonwoven layer laminated to a polyolefin layer. The polyolefin layer can be a single polyolefin layer or membrane, or can be multiple layers or plies of polyolefin laminated or co-extruded together. The polyolefin layer can include polyethylene (PE) layers, polypropylene (PP) layers, polymethylpentene (PMP) layers, and mixtures or combinations thereof. Exemplary combinations or multi-layer structures for the PO layer include PE/PE, PP/PP, PE/PP, PP/PE/PP, PE/PP/PE, PE/PE/PE, PP/PP/PP, PE/PE/PE/PE, PP/PP/PP/PP, PE/PP/PP/PE, PP/PE/PE/PP, PP/PE/PP/PE, PE/PE/PE/PE, PP/PP/PP/PP/PP, PE/PE/PE/PE, PP/PP/PE/PP/PP, PP/PE/PP/PE/PP, PE/PP/PP/PP/PE, PE/PE/PE/PE/PE, PP/PP/PP/PP/PP, PE/PE/PP/PP/PE/PE, PP/PP/PE/PE/PP/PP, PP/PE/PP/PP/PE/PP, PE/PP/PE/PE/PP/PE, PE/PE/PP/PP/PE/PP/PE/PP, PE/PP/PE/PE/PP/PE, PP/PP/PE/PE/PP/PP, PE/PP/PP/PP/PP/PE, PP/PE/PP/PE/PP/PE/PP, PE/PP/PE/PP/PE/PP/PE, or the like.

Generally, the PO layer or membrane has a total thickness from about 2-200 µm, about 4-100 µm, about 5-75 µm, about 5-50 µm, about 15-50 µm, about 15-35 µm, about 25-200 µm, about 50-200 µm, about 50-150 µm, or about 75-125 µm. Each layer or ply of the PO membrane, base film, or layer may be of varied thickness. For example in a multi-layer membrane the PE layers may be of one thickness and the PP layers of another.

Exemplary non-woven materials include polypropylene, polyethylene, low density polyethylene, polycarbonate, polyethylene terephthalate, polybutylene terephthalate, polymethylpentene, polystyrene, polyamide, polyimide, polyester, polytetrafluoroethylene (PTFE), PVDF, nylon, glass, and co-polymers, combinations, blends, or mixtures thereof. In some embodiments, the non-woven layer can include fibers of polypropylene, polyethylene, or a mixture thereof. In certain embodiments, the non-woven layer is selected from a material having a melting point less than about 200° C., less than about 190° C., less than about 180° C., less than about 170° C., less than about 165° C., less than about 160° C., less than about 150° C., less than about 140° C., and/or less than about 135° C. In certain embodiments, the non-woven layer is selected from a material having a melting point higher than about 200° C.

The non-woven layer may be present on one or both sides of the separator membrane or in-between two separator membranes. When a non-woven layer is present on both sides, such membranes are designated sandwich separators.

Non-woven layers may be prepared by conventional processes, and subsequently laminated to the PO layer. For instance, the non-woven layer can be heat and pressure tacked to the polyolefin layer. In other embodiments, the non-woven layer may be directly formed on the PO layer by a wet-laid or dry-laid process. The nonwoven may have a random or ordered appearance such as a fibrous wet-laid or electro-spun random structure or a mesh or net-like structure.

Generally, the non-woven layer has a total thickness from about 2-2000 µm, about 5-1000 µm, about 5-75 µm, about 5-50 µm, about 15-50 µm, about 15-35 µm, about 25-200 µm, about 50-200 µm, about 50-150 µm, or about 75-125 µm.

In some embodiments, the separator membrane includes a surfactant coating or treatment which can increase the surface energy so that the membrane is more easily wetted by an organic or inorganic electrolyte. The surfactant treatment can include an alkali metal salt of a linear or branched alkylbenzene sulfonic acid depicted in the following chemical structure:

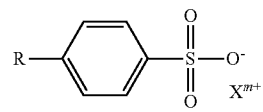

Where R is an alkyl functionality which can be $C_nH_{2n+1}$ with n preferably >6 and more preferably >8 and most preferably ≥12. In some instances, R can be a branched alkyl functionality as depicted in the following chemical structure:

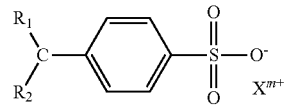

Where $R_1$ and $R_2$ are independently an alkyl functionality which can be $C_nH_{2n+1}$ with n preferably >6 and more preferably >8 and most preferably ≥12. In some embodiments, the alkylbenzene can be a nonylphenyl or dodecylphenyl sulfonic acid salt. A preferred example of an alkali metal salt of a linear or branched alkylbenzene sulfonate acid can be the linear or branched alkylbenzene sulfonate acid lithium salt where $X^{m+}=Li^+$.

In certain embodiments, the surfactant can include one or more lithium salts. Exemplary surfactants include lithium salts of alkylbenzene sulfonic acids, lithium salts of fatty acids, for instance, acids having greater than 6, 8, 10, 12, 14, 16, 18 or 20 carbon atoms. The fatty acid salt can be saturated or unsaturated. Exemplary saturated fatty acids include caprylic acid, capric acid, lauric acid, myristic acid, palmitic acid, stearic acid, and arachidic acid. Exemplary unsaturated fatty acids include myreistoleic acid, palmitoleic acid, sapienic acid, oleic acid, linoleic acid, lenoelaidic acid, and arachidonic acid. In some embodiment, the surfactant can be a lithium salt of an alkylbenzene sulfonic acid, represented by the formula:

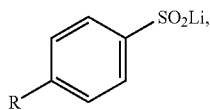

Wherein R is a $C_{1-20}$ alkyl group. An exemplary lithium salt of an alkylbenzene sulfonate acid is lithium 4-dodecylbenzenesulfonate ($R=C_{12}$ alkyl) shown in the following chemical structure:

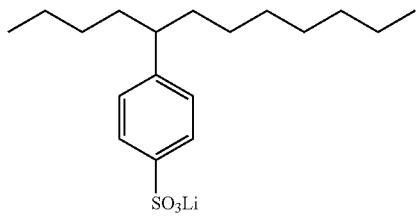

Lithium salts can be preferred due to their chemical stability in a lithium ion rechargeable battery. During repeated cycles in a lithium ion rechargeable battery, degradation products from the electrolyte and other battery components can decompose the surfactant. Lithium salts react less (or not at all) with overcharging products, thereby increasing charge and discharge cycling performance of the battery. The surfactant treated separators described herein may improve the cycling performance of various batteries into which such separators are included.

In some embodiments, the surfactant can include a fluorosurfactant, for instance a partially fluorinated or completely fluorinated surfactant (e.g., a perfluorosurfactant). The fluorosurfactant can be anionic, cationic, or non-ionic. Exemplary non-ionic fluorosurfactants include polyethylene glycol polymers covalently linked to a fluorinated or perfluorinated hydrocarbon chain, such as:

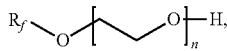

Wherein n is an integer from 10-1000 and $R_f$ is a group having the formula $C_xH_yF_z$, wherein x is an integer from 1-20, and y and z, when taken together, are equal to 2x+1, i.e., y+z=2x+1. In certain embodiments, x is an integer from 6-16. An exemplary perfluorosurfactant includes tridecafluoro octane lithium sulfonate shown in the following chemical structure:

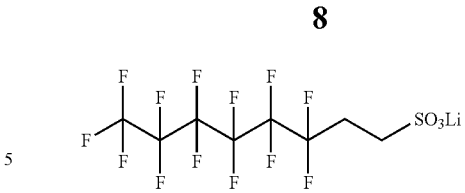

Exemplary anionic surfactants include salts of the compound having the formula:

$$R_f\text{-}\Phi\text{-}A,$$

Wherein $R_f$ has the meaning given above, $\Phi$ is a phenyl ring or is absent, and A is an acidic moiety such as $CO_2H$, $SO_3H$, or $PO_3H_2$. The anionic surfactants can be present as the lithium, sodium, or potassium salt (and lithium salt may be preferred).

One possible exemplary or useful surfactant may be a fluorinated polyoxyalkylene glycol diester surfactant of the formula given in U.S. Pat. No. 8,022,107B2 hereby incorporated by reference herein and with the formula:

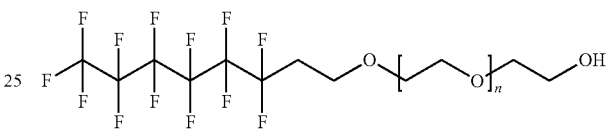

Surfactants typically have a hydrophilic (water loving or oleophobic) end functional group and a hydrophobic or lipophilic (oil-loving or oleophilic) end functional group and the balance of these functionalities is quantified in the hydrophilic-lipophilic balance, HLB, number where HLB can have a value between 0-60, which may define the affinity of a surfactant for water or oil and where the HLB value can be tuned by the length of the alkyl chain.

One or more surfactants can be dissolved or dispersed in a solvent, and then applied to the layers present in the separator membrane described above. In some instances, the surfactant containing solution or suspension can be gravure coated onto a layer, or the layer can be dipped into the surfactant containing solution or suspension. The surfactant can also be incorporated into the layers prior to their formation. For instance, surfactant can be added to polyolefin resin prior to or during extrusion, or surfactant can be added to non-woven fibers prior to a spin process. The surfactant can be incorporated into multiple layers of a composite separator. For instance, surfactant can be coated to a face of a polyolefin layer or membrane, followed by laminating a non-woven layer or another polyolefin layer onto the coated side. It may be preferred to form the membrane and nonwoven structure, then coat or treat it (such as by dip coating to treat both faces of the separator or membrane). The surfactant can also be added to the electrolyte. If coated on the membrane, a lower add on may be effective. If added to the electrolyte, a higher amount may be needed. For example, if 5% is added to the membrane, 10% or more may need to be added to the electrolyte to provide the same improvement in separator wettability.

When a surfactant treatment is applied to a separator, the surface of the separator can have a higher surface energy, lower contact angle, reduced hydrophobicity, and/or be more readily wetted by or absorb an electrolyte, for example, propylene carbonate (PC), ethylene carbonate, mixtures thereof, or other electrolytes. Table 1 shows the wetting capability of untreated versus surfactant treated separators. In the table, the uncoated separator (Celgard 4560) could not be wetted on either the non-woven or film side by the particular electrolyte. The surfactant treated membranes showed significant improvement in wetting capability with the film side being completely wet within 15 seconds and the non-woven side completely wet within 5 seconds.

TABLE 1

| Product | Wet out speed, s | |
|---|---|---|
| | Non-woven side | Film side |
| Untreated control (4560) | infinite | infinite |
| Treated at 2.2% add-on with Nonionic fluorosurfactant | 5 | 15 |
| Treated at 4% add-on with linear LiDBS | 10 | 64 |
| Treated at 5% add-on with branched LiDBS | 4 | 24 |
| Treated at 5% add-on with trideca-fluoro octane lithium sulfonate | 456 | 1200 |

Table 2 shows a significant decrease in the contact angle on both the film and nonwoven sides of the membrane after 3 and 120 seconds of contact time. When compared to the untreated membrane, the surfactant treated membranes demonstrated a contact angle of 0 at 120 s indicating complete wet out.

TABLE 2

| Product | Contact angle from Non-woven side, ° | | Contact angle from Film side, ° | |
|---|---|---|---|---|
| | 3 s | 120 s | 3 s | 120 s |
| Untreated control (4560) | 104 | 104 | 75 | 71 |
| Treated at 2.2% add-on with Nonionic fluorosurfactant | 17 | 0 | 71 | 67 |
| Treated at 4% add-on with linear LiDBS | 14 | 0 | 74 | 67 |
| Treated at 5% add-on with branched LiDBS | 50 | 0 | 74 | 59 |
| Treated at 5% add-on with trideca-fluoro octane lithium sulfonate | 104 | 82 | 72 | 68 |

Common examples of inorganic electrolytes include, but are not limited to, sulfur based, thionyl chloride based and sulfur dioxide based electrolytes. The electrolyte can include one or more conductive salts including aluminates, halides, oxalates, borates, phosphates, arsenates and gallates of an alkali metal, in particular lithium. These inorganic electrolytes may have difficulty wetting certain polypropylene microporous separator membranes and may have a higher surface energy relative to that of polypropylene.

An example of a sulfur-based electrolyte is the inorganic electrolyte system that includes $LiAlCl_4 \cdot xSO_2$, a sulfur dioxide ($SO_2$) based electrolyte which can contain a lithium tetrachloroaluminate conductive salt. The $LiAlCl_4 \cdot xSO_2$ electrolyte is described in U.S. Pat. No. 8,410,759 hereby incorporated by reference herein and contains $SO_2$ and the conductive salt $LiAlCl_4$ with the general chemical structural formula:

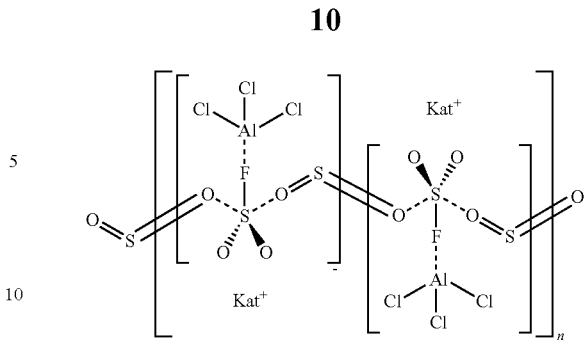

This conductive salt according to U.S. Pat. No. 8,410,759 can be selected from the group consisting of aluminates, halides, oxalates, borates, phosphates, arsenates and gallates of an alkali metal, in particular lithium. An example of a sulfur-based electrolyte is the inorganic electrolyte system that includes $LiAlCl_4 \cdot xSO_2$ or $LiFePO_4$. Use of a surfactant treated separator in a lithium ion battery which employs a sulfur dioxide based electrolyte containing a conductive salt can optimize the charging capacity of the rechargeable lithium ion battery.

The surfactants, agents or materials described above may be more efficient than previously used surfactants for lithium battery separator membranes. By way of example only, in some embodiments, the improved separators described herein may require less than about 50%, less than about 33%, or less than about 25% of the surfactant required to effectuate the same amount of wetting capacity improvement compared with known surfactants for various prior battery separators.

Use of the separators disclosed herein can optimize the battery capacity of the lithium ion battery and promote long cycle life performance of, for example, a $LiFePO_4$ battery, in consumer electronics (CE), electric vehicles (EV) and/or electric storage systems (ESS).

Test Methods for the Examples Data:

Thickness is measured using the Emveco Microgage 210-A precision micrometer thickness tester according to test procedure ASTM D374. Thickness values are reported in units of micrometers (μm).

Wet-out was measured by application of a drop (approximately 0.05 mL) of Propylene Carbonate electrolyte onto the surface of the separator. Time to completely wet out is visually determined as time in seconds for a test sample to wet with electrolyte and change from an opaque white appearance to a transparent clear appearance.

Puncture Strength: Test samples are first pre-conditioned to 73.4° C. and a relative humidity of 50% for a minimum of 20 minutes. An Instron Model 4442 is used to measure puncture strength of test sample. Thirty measurements are made across the diagonal direction of a 1¼"×40" continuous sample specimen and averaged. The needle has a 0.5 mm radius. The rate of descent is 25 mm/min. The film is held tight in a clamping device which utilizes an O-ring to securely hold the test sample in place. The diameter of this secured area is 25 mm. The displacement (in mm) of the film that was pierced by the needle is recorded against the resistance force (in gram force) developed by the tested film. The maximum resistance force is the puncture strength in units of gram force (gf). A load-versus-displacement plot is produced by this test method.

The tensile strength along the MD and TD is measured using Instron Model 4201 according to ASTM D-882 method.

Thermal shrinkage testing is measured by placing a 10 cm×10 cm membrane sample in a manila folder which is then suspended in an oven using a clip. Shrinkage was measured using calipers in the MD and TD direction before and after a test sample were was placed in the oven at 105° C. for 1 hour. Shrinkage was also measured using calipers in the MD and TD direction before and after a second test sample were was placed in the oven at 120° C. for 1 hour. Shrinkage is expressed as a % MD shrinkage and % TD shrinkage using modified ASTM 2732-96.

Adhesion was measured using ASTM method D-1876 "Standard test method for peel resistance of adhesives."

Gurley number was measured by using a Gurley densometer (Model 4120), ASTM-D726 (B)-Gurley. The Gurley number was determined by determining the time which a gas volume of 100 ml takes to pass through a 6.45 cm² area under a 31 cm hydrohead gas pressure. The time (t) is the Gurley number.

Hot Electrical Resistance is a measure of resistance of a separator film under 50 lb pressure while the temperature is linearly increased at a rate of 60° C./minute. A ⅜" diameter piece of separator is saturated with electrolyte and sandwiched between two electrode discs made of Al or Cu. The rise in resistance is measured as Impedance and corresponds to a collapse in pore structure due to melting or "shutdown" of the microporous separator membrane. When a microporous separator membrane has sustained high level of electrical resistance at elevated temperatures, this is indicative that the separator membrane may prevent electrode shorting in a battery.

Loading of coating or coating surface density is measured in weight % of solution or using ASTM D3776 and the units are expressed in mg/cm².

Example 1: NW/PO/NW Separator (No Surfactant)

A trilayer separator was made by laminating a 60 μm thick PP non-woven layer to each side of a Celgard® 2500 polypropylene separator using silicon heated (surface temp 240° F.) and smooth metal heated (surface temp 250° F.) rolls. The two 60 μm PP non-woven layers were combined with the 25 μm thick microporous Celgard 2500 membrane under 50 psi to produce a 104 μm trilayer separator.

Figure 2:
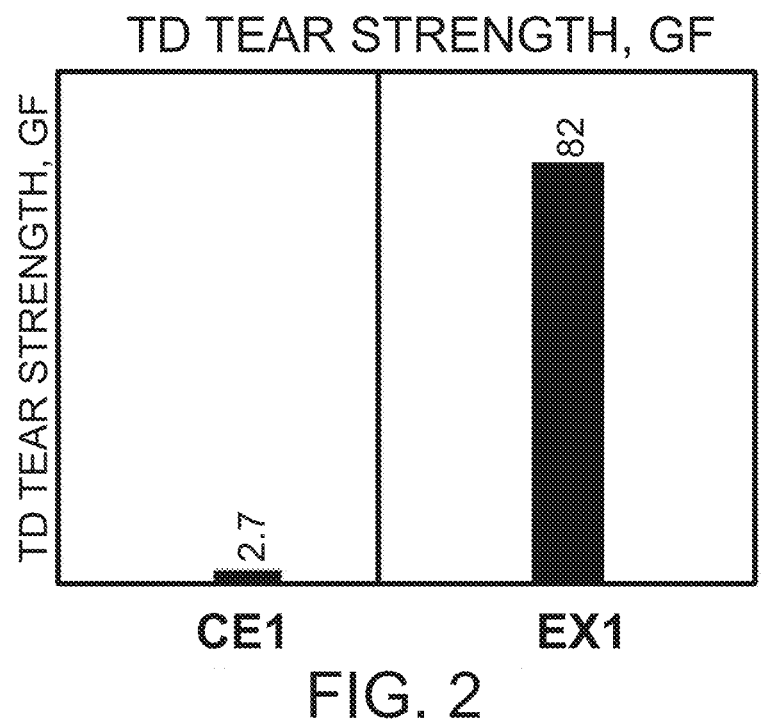
FIG. 2 is a chart demonstrating the improved TD tear strength of the non-woven membrane composite separator compared to polyolefin only separators.
Figure 3:
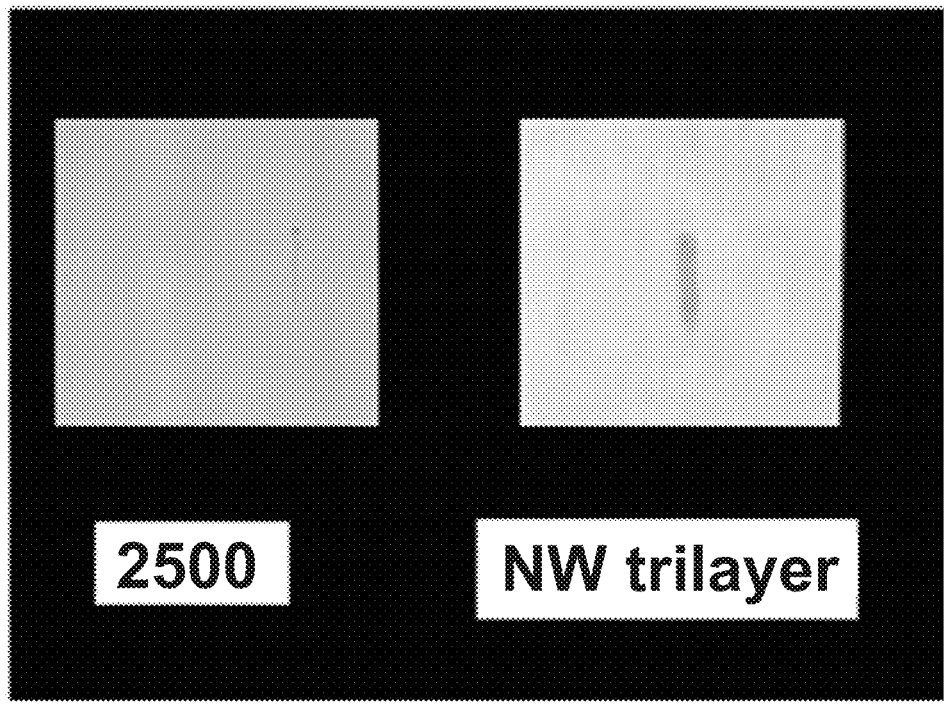
FIG. 3 is a graphic showing improved wettability of a non-woven membrane composite separator compared to polyolefin only separators.

FIG. 1 shows an example of a non-woven/membrane/non-woven trilayer separator. The outer layers of the separator are 46.3 μm and 35.1 μm with a polypropylene inner layer of 26.9 μm. The lamination of two non-woven layers to the outside of the polyolefin layer improves separator performance relative to similar polyolefins not containing a non-woven layer. The sandwich separator has improved wettability from 34 to 38 dynes/cm, shown in FIG. 3. The sandwich separator has decreased shrinkage and increased TD tear strength (see FIG. 2 and Table 3). The sandwich separator's TD tear strength is increased from 2.7 gf to 82 gf. Shrinkage percentage decreased in both from 9.47% to 3.07% (MD %, Table 3).

TABLE 3

(no surfactant)

| Property | | | NW (CE 1) | 2500 (CE2) | NW/2500/NW EX1 |
|---|---|---|---|---|---|
| Shrinkage | 120 C. 1 hr | % MD | 1.33 | 9.47 | 3.07 |
| | | % TD | 0.22 | −0.63 | −0.51 |
| Thickness | Avg | μm | 60 | 25.3 | 106 |
| | CV* | % | 3.7 | 2.0 | 2.9 |
| JIS Gurley | JIS Avg | s | 0 | 185 | 212 |
| | ASTM | s | 0 | 7.5 | 7.4 |
| Puncture Strength | Avg | gf | 76 | 301 | 400 |
| MD Tensile | Stress at break | Kgf/cm² | 39.9 | 1150 | 313 |
| | Strain at break | % | 44.6 | 95.4 | 60 |
| | Young's Modulus | kgf/cm² | 559.3 | 7937 | 3310 |
| TD Tensile | Stress at break | Kgf/cm² | 31.8 | 125 | 80 |
| | Strain at break | % | 52.6 | 492.6 | 51 |
| | Young's Modulus | kgf/cm² | 268 | 3207 | 1855 |
| ER | | ohm-cm² | 1.11 | 1.07 | — |
| MacMullin # | | | 1.6 | 3.6 | 3.3 |
| Adhesion | gf | Smooth side | NA | NA | 20.2 |
| | | Rough side | NA | NA | 20.4 |

Example 2: Surfactant Treated Separator

In this Example, the Control Example (CE1) was commercially available Celgard®4560 separator (no surfactant, one side nonwoven). Celgard®4560 is a 110 μm thick microporous composite separator consisting of a Celgard®2500 polypropylene membrane (Celgard® 2500 is a 25 μm thick monolayer polypropylene membrane) laminated to a 85 μm thick polypropylene nonwoven layer (nonwoven on one side only, no surfactant). For the inventive Examples, various coatings having varying weight percent add-on levels and varying coating surface densities, as well as varying weight percent of the surfactant in the methanol-containing coating solution, were applied to samples of the Celgard®4560 composite separator. Specifically, the samples were coated with various solutions of lithium 4-dodecylbenzenesulfonate surfactant (LiDBS) in methanol at varying concentrations. Table 4 lists coating data for Examples 1-4 which were coated with a solution of lithium 4-dodecylbenzenesulfonate in methanol at concentrations ranging from 0.5 weight % to 2.0 weight %.

TABLE 4

| Example | Weight % Surfactant in Coating solution (containing methanol) | Weight % Add-on Level of Surfactant | Coating Surface Density, mg/cm² | Wet out time (seconds) |
| --- | --- | --- | --- | --- |
| Ex. 1 | 2.0 | 4.84 | 0.094 | 0.5 |
| Ex. 2 | 1.5 | 3.84 | 0.074 | 2 |
| Ex. 3 | 1.0 | 2.58 | 0.050 | 5 |
| Ex. 4 | 0.5 | 1.37 | 0.026 | 20 |
| CE 1 (uncoated) | 0 | 0 | 0 | infinite |

Ex. 1 is a Celgard®4560 separator which was double-side dip coated with a 2.0 wt. % solution of lithium 4-dodecylbenzenesulfonate in methanol and has a 4.84 weight % add-on. Ex. 2 is a Celgard®4560 separator which was double-side dip coated with a 1.5 weight % solution of lithium 4-dodecylbenzenesulfonate in methanol and has a 3.84 weight % add-on. Ex. 3 is a Celgard®4560 separator which was double-side dip coated with a 1.0 weight % solution of lithium 4-dodecylbenzenesulfonate in methanol and has a 2.58 weight % add-on. Ex. 4 is a Celgard®4560 separator which was double-side dip coated with a 0.5 weight % solution of lithium 4-dodecylbenzenesulfonate in methanol and has a 1.37 weight % add-on. CE 1 is the uncoated Celgard®4560 separator which does not readily wet as indicated by an infinite wet out time.

Figure 4:
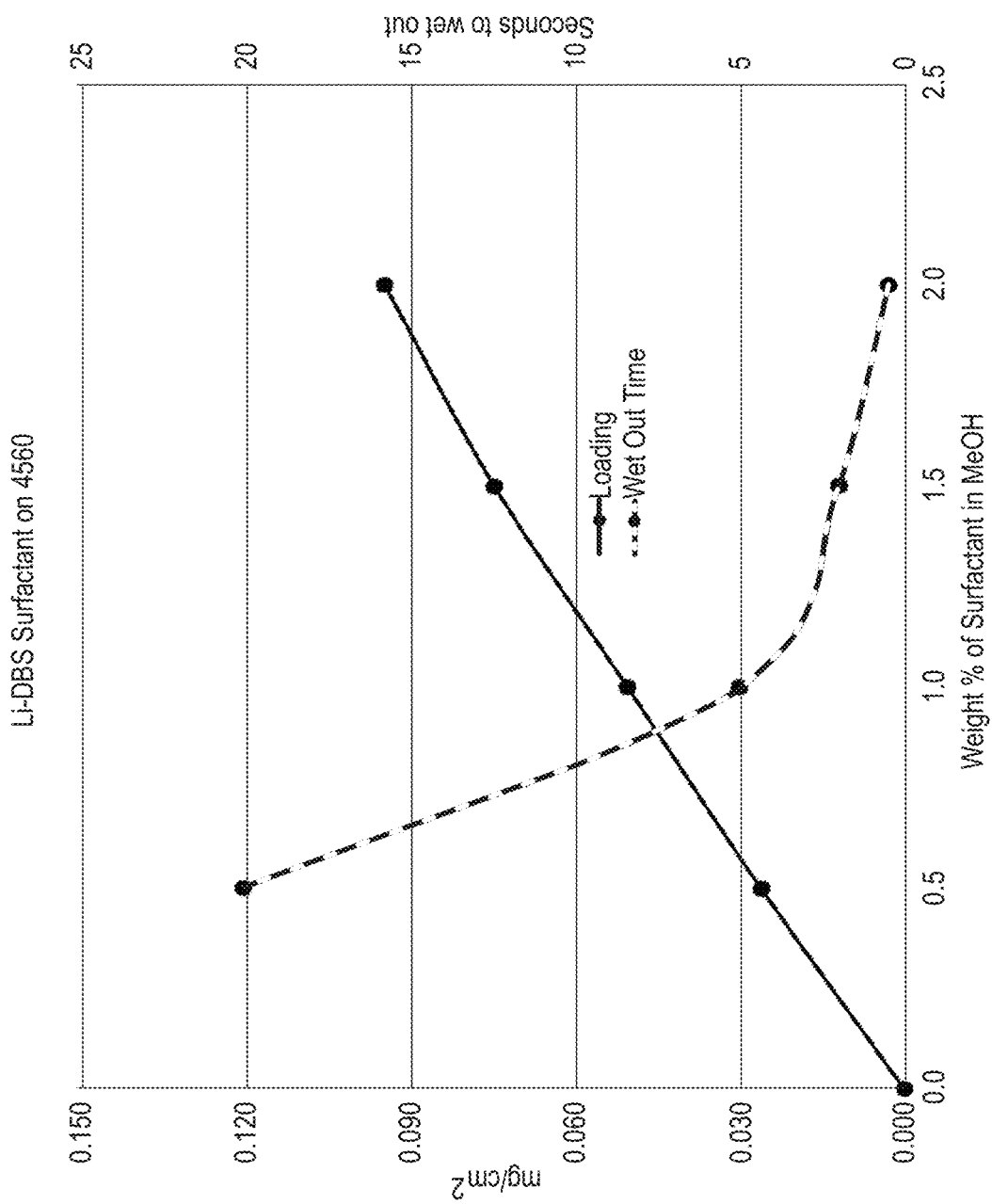
FIG. 4 includes a graph depicting the loading or surface density of the surfactant (in mg/cm$^2$) for surfactant-treated separators as a function of the weight % of the surfactant in methanol, where the secondary y-axis is wet-out time (in seconds) in accordance with various surfactant loadings.

FIG. 4 shows the correlation between wet-out time in seconds, surfactant loading in weight % in coating solution, and surface density in mg/cm² of lithium 4-dodecylbenzenesulfonate surfactant applied to Celgard®4560 laminated polypropylene separator.

Propylene carbonate (PC) can be used to assess the wettability of a membrane by an electrolyte. A polypropylene microporous membrane which is wettable by PC is likely wettable by other electrolytes, for example, an inorganic electrolyte including $LiAlCl_4 \cdot xSO_2$. Typical organic electrolytes for rechargeable lithium ion batteries may be based on combinations of linear and cyclic alkyl carbonates. Common examples of organic electrolytes include, but are not limited to, propylene carbonates (PC), ethylene carbonate (EC), dimethyl carbonate (DMC), and mixtures thereof. Propylene carbonate may have a surface energy of about 41 dyne/cm and does not tend to wet a polypropylene microporous separator membrane which may have a lower surface energy of about 30-36 dyne/cm.

Table 4 lists wet-out times using a propylene carbonate as the electrolyte. Wet-out times of ≤20 seconds were observed with a coating loading of lithium 4-dodecylbenzenesulfonate surfactant as low as 0.026 mg/cm². Optimal wet out for 0.094 mg/cm² coating was 0.5 seconds indicating that the lithium 4-dodecylbenzenesulfonate surfactant coating can remarkably improve the electrolyte wetting from a value of zero wet out observed for an uncoated separator membrane compared to a wet out time of 0.5 seconds for a separator coated with a coating density that is a 0.094 mg/cm². Since the surfactant treatment effectively enhances the electrolyte wetting speed of the coated polypropylene microporous separator membrane from essentially no wetting to complete wetting in less than one second, a battery containing the inventive surfactant-treated separator membrane will have a faster electrolyte filling time. Furthermore, an electrolyte wetting speed of less than 1 second is indicative of higher electrolyte absorption by the coated microporous separator membrane which can lead to improved capacity performance in a lithium ion battery.

Example 3: Battery Capacity of Surfactant Treated Separator

In this Example, a sample of a Celgard® monolayer polypropylene membrane of about 20 microns in thickness was coated according to embodiments discussed herein with a solution of the lithium 4-dodecylbenzenesulfonate surfactant (LiDBS).

Figure 5:
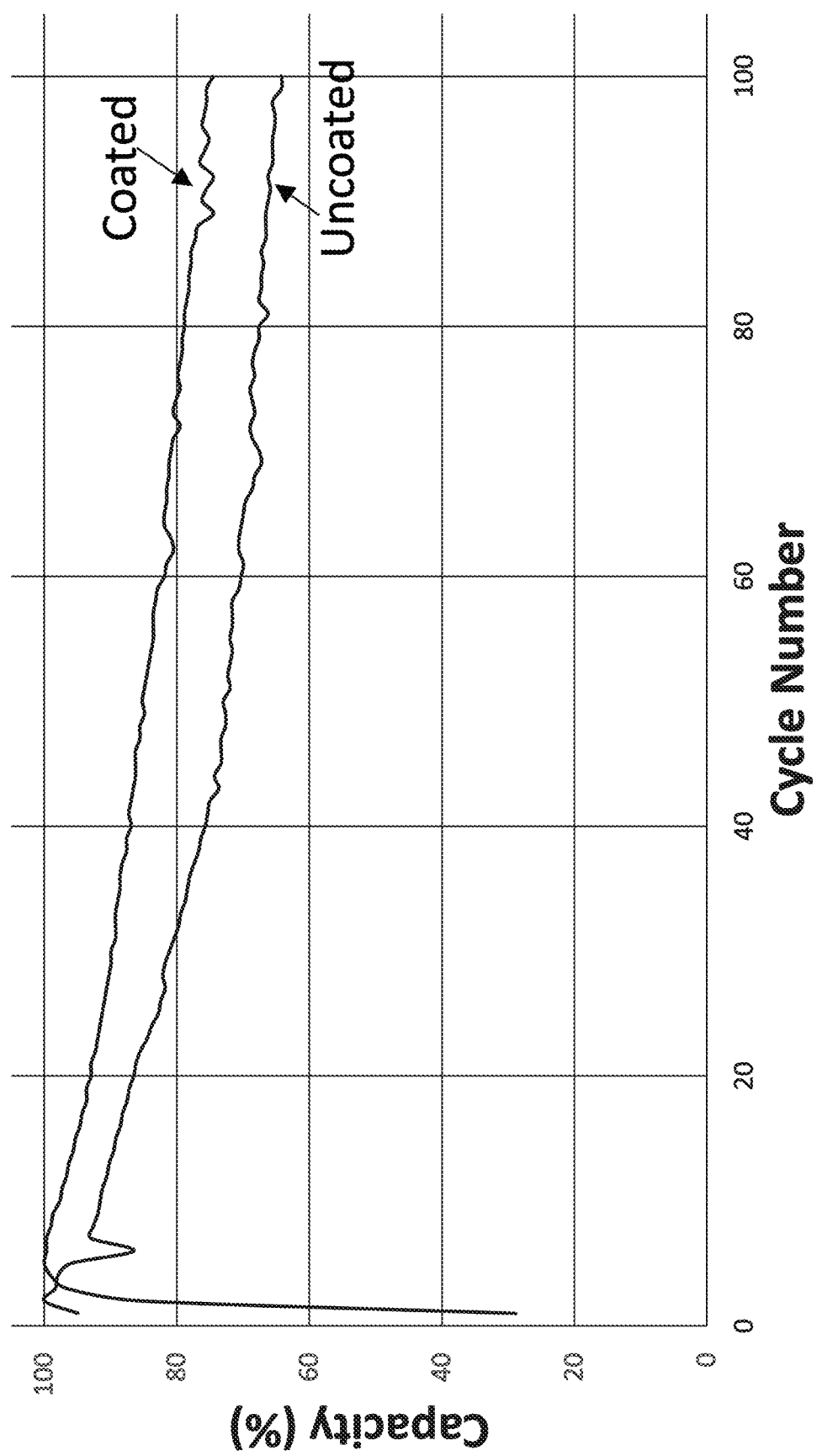
FIG. 5 includes a graph depicting the battery capacity (%) as a function of cycle number for a surfactant coated separator membrane compared with an uncoated polypropylene microporous separator membrane.

FIG. 5 demonstrates the capacity of the battery versus the number of cycles for the inventive surfactant coated Celgard® separator in a lithium iron phosphate ($LiFePO_4$) battery versus an uncoated sample of the same Celgard® monolayer polypropylene separator membrane of about 20 microns thickness. FIG. 5 shows a clearly evident trend of improved battery capacity (by reducing capacity fade) for the inventive surfactant coated separator in contrast to the untreated or uncoated separator which shows decreasing battery capacity and more capacity fade. The decrease in battery capacity by the untreated membrane which would continue to decrease at higher number of cycles may be undesirable.

In accordance with at least selected embodiments, aspects or objects, the present application or invention provides or is directed to novel or improved separator membranes, separators, batteries, cells, systems, and/or methods of making such membranes, separators, batteries, cells, and/or systems, and/or methods of using such membranes, separators, batteries, cells, and/or systems; to novel or improved multilayer or laminated battery separators or membranes, lithium ion batteries including such separators, and/or methods of making and/or using such battery separators and/or lithium batteries, including but not limited to rechargeable lithium batteries, secondary lithium ion batteries, and the like; to a multilayer microporous battery separator having at least one nonwoven layer, and adapted for use in rechargeable lithium ion batteries and/or the methods related to making and/or using such multi-layered separators; to novel or improved composite, multilayer or laminated battery separators having at least two nonwoven layers, lithium batteries including such separators, and/or methods of making and/or using such battery separators and/or lithium batteries; to surfactant or material coated, treated or containing microporous battery separator membranes or separators, lithium batteries including such separator membranes or separators, and/or methods of making and/or using such battery separators and/or lithium batteries; to surfactant or wettability enhancing material coated, treated or containing composite, multilayer or laminated battery separators having at least one nonwoven layer, possibly preferably two nonwoven layers (one on each side) for a rechargeable lithium ion battery and/or a method of making a surfactant coating for a microporous battery separator for a rechargeable lithium ion battery, and/or methods of making and/or using such separators, batteries, and/or the like; to novel or improved surfactants, wettability enhancing materials, coatings, treatments, components, and/or the like, membranes, separators, composites, multilayer or laminated battery separators, separators having at least one nonwoven layer, separators having two nonwoven layers (one on each side) for a rechargeable lithium battery having the novel or improved surfactants, wettability enhancing materials, coatings, treatments, and/or components, and/or a method of making the novel or improved surfactants, wettability enhancing materials, coatings, treatments, and/or components, and/or methods of using the novel or improved surfactants, wettability enhancing materials, coatings, treatments, and/or components, and/or the separators, batteries, and/or the like having such novel or improved surfactants, wettability enhancing materials, coatings, treatments, and/or components therein, and/or the like. In accordance with at least certain embodiments, aspects or objects, the present application or invention addresses or solves the prior problems or issues of low wettability, hydrophobicity, slow electrolyte wetting or filling, surfactant durability, and/or the like.

In accordance with at least certain embodiments, the present invention is directed to separator membranes, separators or membrane based separators. The membranes or separators may include non-woven layers, improved surfactant treatments, or combinations thereof. The separators or membranes are useful for lithium batteries, especially rechargeable lithium ion batteries, and provide improved performance, wettability, cycling ability, and/or recharging efficiency.

In accordance with at least selected embodiments, the present invention is directed to novel, improved, coated, or treated separator membranes, separators or membrane based separators for lithium batteries. The membranes or separators may include non-woven layers, improved surfactant treatments, or combinations thereof. The separators or membranes are useful for solvent electrolyte lithium batteries, especially rechargeable lithium ion batteries, and provide improved performance, wettability, cycling ability, and/or recharging efficiency.

In accordance with certain embodiments, exemplary surfactants, agents or materials may include:

Surfactant dodecyl benzene sodium sulfonate (DBS) or sodium dodecyl sulfate (SDS);

Nonionic fluorosurfactant that provides exceptionally low surface tension in aqueous or solvent-based products, enabling better wetting;

Fluorosurfactants, or fluorinated surfactants, such as synthetic organofluorine chemical compounds that have multiple fluorine atoms, they can be polyfluorinated or fluorocarbon-based (perfluorinated), as surfactants, they are more effective at lowering the surface tension of water or polar solvents than comparable hydrocarbon surfactants, they have a fluorinated "tail" and a hydrophilic "head";

Nonionic fluorosurfactant that provides exceptionally low surface tension in aqueous or solvent-based products, enabling better wetting, spreading, leveling, and other beneficial properties, VOC-free, APEO-free, non-flammable, and is compatible with additives and resins of any ionic class, even at very low concentrations, it can deliver tremendous wetting power, stable in acidic, basic, brine, and hard water environments, making it easy to formulate into a variety of systems;

Nonionic flurosurfactant, non-flammable, VOC & APEO free, used in solvent-based coatings to reduce imperfections like cratering and as a wetting & leveling agent, provides coatings weatherability, soil resistance and UV stability, internal lubricant and anti-fogging agent for polymers;

Fluorosurfactants or fluorocarbon-based surfactants which are extremely effective even when used at extremely low concentrations (0.001% to 0.1%), enhance wetting, leveling, anti-cratering, dirt pick-up resistance and oil repellency in many applications;

Nonionic fluorosurfactant that repels water (may be easier to dry before electrolyte injection) or is active at very low add-on;

Nonionic fluorosurfactant or fluorinated glycol ether that repels water; and/or

Lithium stearate a chemical compound with the formula $LiO_2C(CH_2)_{16}CH_3$, formally classified as a soap (a salt of a fatty acid), a white soft solid, prepared by the reaction of lithium hydroxide and stearic acid, lithium stearate and lithium 12-hydroxystearate are lithium soaps, and are components of lithium grease.

The present invention may be embodied in other forms without departing from the spirit and the essential attributes thereof, and, accordingly, reference should be made to the appended claims, rather than to the foregoing specification, as indicating the scope of the invention.

What is claimed is:

1. A microporous battery separator for a lithium battery, comprising:
   a) a polyolefin layer which comprises at least one membrane of polypropylene; and
   b) at least one non-woven layer on at least one side of the polyolefin layer, wherein the non-woven layer comprises polypropylene, and wherein the separator has a surfactant coating thereon and wherein the surfactant coating consists of a combination of lithium salts of a linear and branched alkylbenzene sulfonic acid depicted in the following chemical structures (1) and (2) in a combined weight add-on amount of from about 1.37% to about 10.0 wt. %:

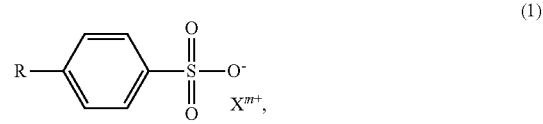

where R is an alkyl functionality having the following formula $C_nH_{2n+1}$ with n >6 and $X^{m+}$ is $Li^+$ or

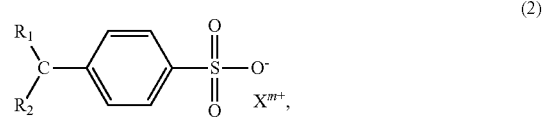

where R1 and R2 are independently an alkyl functionality which can be $C_nH_{2n+1}$, with n>6 and $X^{m+}$ is $Li^+$.

2. The separator according to claim 1, wherein n is greater than 8 for either the lithium salt of a linear or branched alkylbenzene sulfonic acid depicted in chemical structure (1) or the lithium salt of a linear or branched alkylbenzene sulfonic acid depicted in chemical structure (2).

3. The separator according to claim 1, wherein n is between 12 and 20 for either the lithium salt of a linear or branched alkylbenzene sulfonic acid depicted in chemical structure (1) or the lithium salt of a linear or branched alkylbenzene sulfonic acid depicted in chemical structure (2).

4. The separator according to claim 1, wherein the one of or a combination of the lithium salts of a linear or branched alkylbenzene sulfonic acid are present in the weight add-on amount from about 2.58% to about 10%.

5. The separator according to claim 1, wherein the one of or a combination of the lithium salts of a linear or branched alkylbenzene sulfonic acid are present in a weight add-on amount from about 2.58% to about 4.84%.

6. The separator according to claim 1, wherein the non-woven layer comprises a non-woven layer having a melting point less than about 200° C.

7. The separator according to claim 1, wherein the non-woven layer further comprises polyethylene, low density polyethylene, polycarbonate, polyethylene terephthalate, polybutylene terephthalate, polymethylpentene, polystyrene, polyamide, polyimide, nylon, or a combination, blend or mixture thereof.

8. The separator of claim 1, wherein the separator wets by an organic or inorganic electrolyte in less than 5 seconds.

9. The separator of claim 1, wherein the separator wets by an organic or inorganic electrolyte in less than 1 second.

10. The separator according to claim 1, wherein the polyolefin layer further comprises at least one membrane or layer of polyethylene.

11. The separator according to claim 1, wherein the polyolefin layer further comprises at least one membrane of polyethylene, polypropylene, or a combination, blend or mixture thereof.

12. The separator according to claim 1, wherein the polyolefin layer which comprises at least one membrane of polypropylene comprises multiple layers of polypropylene, or multiple layers of polyethylene and polypropylene.

13. The separator according to claim 12, wherein the polyolefin layer is selected from one of the following multilayer arrangements: PP/PP, PE/PP, PP/PE/PP, PE/PP/PE, PP/PP/PP, PP/PP/PP/PP, PE/PP/PP/PE, PP/PE/PE/PP, PP/PP/PP/PP/PP, PP/PP/PE/PP/PP, PP/PE/PP/PE/PP, PE/PP/PE/PP/PE, PP/PP/PP/PP/PP/PP, PE/PE/PP/PP/PE/PE, PP/PP/PE/PE/PP/PP, PP/PE/PP/PP/PE/PP, PE/PP/PE/PE/PP/PE, PP/PE/PE/PE/PE/PP, and PE/PP/PP/PP/PP/PE.

\* \* \* \* \*